US009131709B2

(12) United States Patent
Hammonds et al.

(10) Patent No.: US 9,131,709 B2
(45) Date of Patent: Sep. 15, 2015

(54) FROZEN BEVERAGE DISPENSING MANIFOLD

(75) Inventors: Marcus Hammonds, New Rochelle, NY (US); Alice Ro, Brooklyn, NY (US); Marco Perry, Brooklyn, NY (US); Todd Brunner, Brooklyn, NY (US); Avi Bajpai, Washington, DC (US)

(73) Assignee: PepsiCo, Inc., Purchase, NY (US)

( * ) Notice: Subject to any disclaimer, the term of this patent is extended or adjusted under 35 U.S.C. 154(b) by 731 days.

(21) Appl. No.: 13/152,819

(22) Filed: Jun. 3, 2011

(65) Prior Publication Data

US 2011/0297272 A1  Dec. 8, 2011

Related U.S. Application Data

(60) Provisional application No. 61/351,628, filed on Jun. 4, 2010.

(51) Int. Cl.
*A23G 9/04* (2006.01)
*A23G 9/28* (2006.01)
*A23G 9/48* (2006.01)

(52) U.S. Cl.
CPC ............. *A23G 9/045* (2013.01); *A23G 9/281* (2013.01); *A23G 9/282* (2013.01); *A23G 9/283* (2013.01); *A23G 9/48* (2013.01)

(58) Field of Classification Search
USPC ............... 141/283, 104–105, 173–174, 9, 98; 222/132, 136, 146.6, 145.3, 134, 63, 222/129.4, 144.5
See application file for complete search history.

(56) References Cited

U.S. PATENT DOCUMENTS

| 2,260,298 | A |   | 10/1941 | Cowling |
|-----------|---|---|---------|---------|
| 3,089,614 | A |   | 5/1963  | Wise |
| 4,645,093 | A |   | 2/1987  | Jones |
| 4,683,921 | A |   | 8/1987  | Neeser |
| 4,951,719 | A |   | 8/1990  | Wiley |
| 4,966,205 | A | * | 10/1990 | Tanaka .............................. 141/9 |
| 5,027,698 | A |   | 7/1991  | Chirnomas |
| 5,293,909 | A |   | 3/1994  | Weiss |

(Continued)

FOREIGN PATENT DOCUMENTS

CN  101190000  6/2008
DE  3810298  10/1989

(Continued)

OTHER PUBLICATIONS

International Search Report and Written Opinion for PCT/US2011/039118 mailed Oct. 10, 2011.

*Primary Examiner* — Timothy L Maust
*Assistant Examiner* — Timothy P Kelly
(74) *Attorney, Agent, or Firm* — Banner & Witcoff, Ltd.

(57) ABSTRACT

A frozen beverage dispensing unit includes a first replaceable frozen beverage module, a second replaceable frozen beverage module, a plumbing module, and a dispensing module. The dispensing module includes a programmable dispensing manifold for preparing frozen beverages in accordance with dispensing profiles. In an embodiment, a rotating turn table turns a beverage container in accordance with a dispensing profile. The dispensing profile includes instructions for layering of contents of different frozen beverage modules being placed in a beverage container. Moreover, the contents of different food add-in modules may also be added to the beverage container based on the selected dispensing profile.

20 Claims, 8 Drawing Sheets

(56) References Cited

U.S. PATENT DOCUMENTS

| | | |
|---|---|---|
| 5,473,909 A | 12/1995 | Kateman |
| 5,743,640 A | 4/1998 | Crossley |
| 5,799,832 A * | 9/1998 | Mayo .......................... 222/135 |
| 6,145,701 A | 11/2000 | Van Der Merwe |
| 6,355,290 B1 | 3/2002 | Soehnlen |
| 6,604,654 B2 | 8/2003 | Staten |
| 6,689,410 B2 | 2/2004 | Gerber |
| 6,742,552 B2 | 6/2004 | Raniwala |
| 6,907,741 B2 | 6/2005 | Kateman |
| 7,052,728 B2 | 5/2006 | Kateman |
| 7,165,878 B1 | 1/2007 | Mimran |
| 7,178,976 B2 | 2/2007 | Gerber |
| 7,290,682 B2 | 11/2007 | Harra |
| 7,559,346 B2 | 7/2009 | Herrick |
| 8,402,781 B2 | 3/2013 | Cocchi |
| 8,807,176 B2 * | 8/2014 | Hilliard et al. .................... 141/9 |
| 2006/0054614 A1 | 3/2006 | Baxter |
| 2006/0157152 A1 * | 7/2006 | Wolski et al. ................. 141/275 |
| 2007/0110872 A1 | 5/2007 | Gerber |
| 2008/0011009 A1 | 1/2008 | Timmons |
| 2008/0073376 A1 | 3/2008 | Gist |
| 2008/0127837 A1 | 6/2008 | Cocchi |
| 2008/0317924 A1 | 12/2008 | Yang |
| 2009/0007984 A1 | 1/2009 | Nuriely |

FOREIGN PATENT DOCUMENTS

| | | |
|---|---|---|
| JP | 48011191 | 3/1973 |
| JP | S63187877 A | 2/1989 |
| JP | 1993068285 | 9/1993 |
| JP | 08070783 | 3/1996 |
| JP | 1998248494 | 9/1998 |
| JP | 2007528225 A | 10/2007 |
| JP | 2009525549 A | 7/2009 |
| WO | 2007090165 | 8/2007 |
| WO | 2009037446 | 3/2009 |

* cited by examiner

FROZEN BEVERAGE DISPENSING MANIFOLD

This application claims the benefit of U.S. Provisional Application No. 61/351,628, which was filed on Jun. 4, 2010, the disclosure of which is hereby incorporated by reference in its entirety.

FIELD OF THE INVENTION

This invention generally relates to frozen beverage dispensing systems. More particularly, aspects of the disclosure provide a frozen beverage dispensing system and method for dispensing multiple layered frozen beverages and solid add-ins.

BACKGROUND

Beverage dispensing units have become a popular way for food and beverage establishments to create on-site fountain beverages. These beverage dispensing units are used to dispense frozen specialty beverages such as shakes, smoothies, and other frozen style drinks.

Conventional frozen beverage dispensers typically have a separate manifold and dispensing system for each different frozen beverage. If a consumer orders a beverage which contains more than one different frozen beverage, the operator would dispense each product separately from that frozen product's dispensing system. In addition, if the ordered beverage includes a solid add-in product such as a fruit, it would be added by a different apparatus or scooped manually into the frozen beverage.

Creation of a beverage that contains multiple frozen products along with additional dry add-in products is labor intensive. Also, as the number of ingredient offerings increases, the number of different final product combinations also increases exponentially. Creating so many different frozen product beverage combinations becomes very operator training and labor intensive. Furthermore, the nature of preparing a beverage that contains at least two frozen products leads to final product inconsistentency as manual preparation of such beverages is heavily dependent upon operator preferences.

Therefore, there is a need for a frozen beverage dispensing system that dispenses consistent frozen beverages that include at least two frozen ingredients, automatically dispenses an array of solid products into the beverage, when required, and reduces operator training and labor costs.

BRIEF SUMMARY

Aspects of the disclosure overcome problems and limitations of the prior art by providing a frozen beverage dispensing unit to dispense frozen beverages. In an embodiment, the frozen beverage dispensing unit may include connectable modules that can be easily assembled, disassembled, and serviced.

In an embodiment, a frozen beverage dispensing unit may include a first replaceable frozen beverage module, a second replaceable frozen beverage module, a dispensing module, and a plumbing module. The first replaceable frozen beverage module may contain a first frozen beverage and the second replaceable frozen beverage module may contain a second frozen beverage. The first and second replaceable frozen beverage modules may be operationally connected to the dispensing module through the plumbing module.

In an embodiment, the dispensing module may include a programmable dispensing manifold for preparing frozen beverages in accordance with dispensing profiles.

In an embodiment, a first portion of the plumbing module may connect the first replaceable frozen beverage module and the second replaceable frozen beverage module to the dispensing module.

In an embodiment, food add-in pieces may be mixed into the frozen beverage. A pump may cause suspended food pieces to be pumped into the plumbing module and flow through the dispensing module and into the beverage.

The frozen beverage dispensing module may also include a pan that is positioned to collect the frozen beverage that may leak from the frozen beverage dispensing unit when it is in operation. The frozen beverage dispensing unit may also include a rotating turn table to rotate the beverage container as the beverage is being dispensed via the dispensing module.

In an embodiment, the rotating turn table supports the layering of contents of different frozen beverage modules being placed in a beverage container. In another embodiment, the layering may be of different thickness and patterns. Moreover, the contents of different food add-in modules may also be added in the beverage container as the beverage container is being rotated to create efficient layering of the added products.

DETAILED DESCRIPTION

Figure 1:
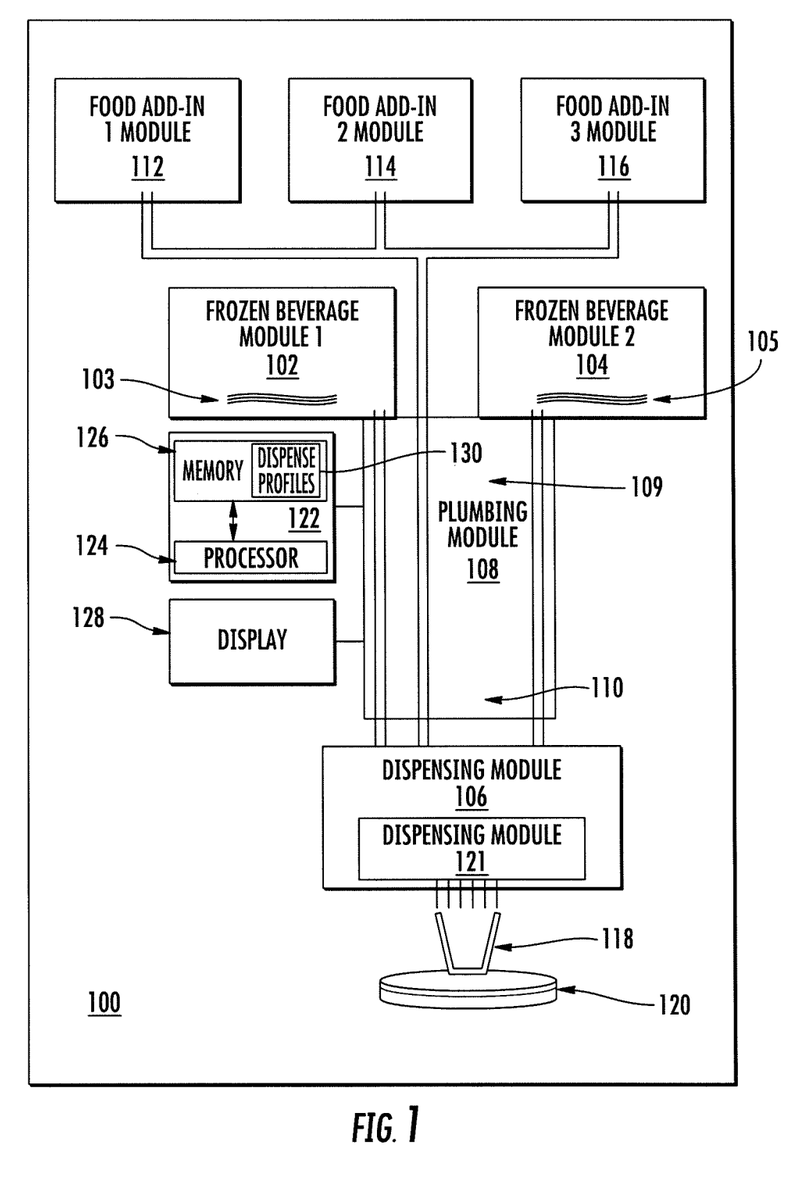
FIG. 1 illustrates a block diagram of a frozen beverage dispensing unit, in accordance with various aspects of the disclosure.

FIG. 1 illustrates a frozen beverage dispensing unit 100 in accordance with an aspect of the disclosure. The frozen beverage dispensing unit 100 comprises modular components that allow for rapid replacement and addition of the components. A first replaceable frozen beverage module 102 may include a first frozen beverage 103. The first frozen beverage 103 may be a particular flavor of shake or smoothie. A second replaceable frozen beverage module 104 may include a second frozen beverage 105. The second replaceable frozen beverage 105 may include a second flavored shake or smoothie. The frozen beverage dispensing unit 100 having at least two different flavors of frozen beverages is capable of creating a variety of different frozen flavored beverages.

In an aspect of the disclosure, the first and second replaceable frozen beverage modules (102 and 104) may be operationally connected to a dispensing module 106 through a plumbing module 108. The plumbing module 108 may include a first portion 109 that connects the first replaceable frozen beverage module 102 and the second replaceable frozen beverage module 104 to dispensing module 106. A second portion of the plumbing module 110 may include a pump and motor assembly (702, FIG. 7).

In another aspect of the disclosure, food add-in modules 112-116 may include suspended food pieces that may be mixed into a frozen beverage. For instance, FIG. 1 illustrates three food add-in modules 112, 114, and 116. Those skilled in the art will realize that any number of replaceable food add-in modules may be connected to frozen beverage dispensing unit 100. The food add-in modules 112-116 may include solid food particles such as oats, cookie crumbs, nuts, granola, and candy that may added to a frozen beverage. In an embodiment, pump and motor assembly (702, FIG. 7) may cause suspended food pieces to be pumped into plumbing module 108 and flow through dispensing module 106 into beverage container 118.

In an aspect of the disclosure, frozen beverage dispensing unit 100 may also include a rotating tray 120 to rotate beverage container 118 as the beverage is being dispensed via dispensing module 106. In an embodiment, rotating tray 120 supports layering contents of different frozen beverages being dispensed into beverage container 118. In another embodiment, the layering may be comprised of different thickness and patterns.

Figure 2:
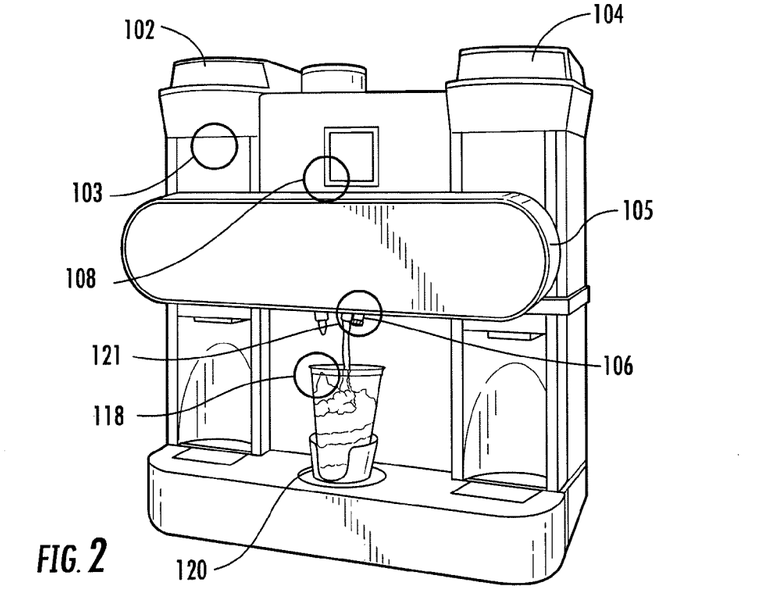
FIG. 2 illustrates a frozen beverage dispensing unit including two replaceable frozen beverage modules and a dispensing module in accordance with an aspect of the disclosure.
Figure 4:
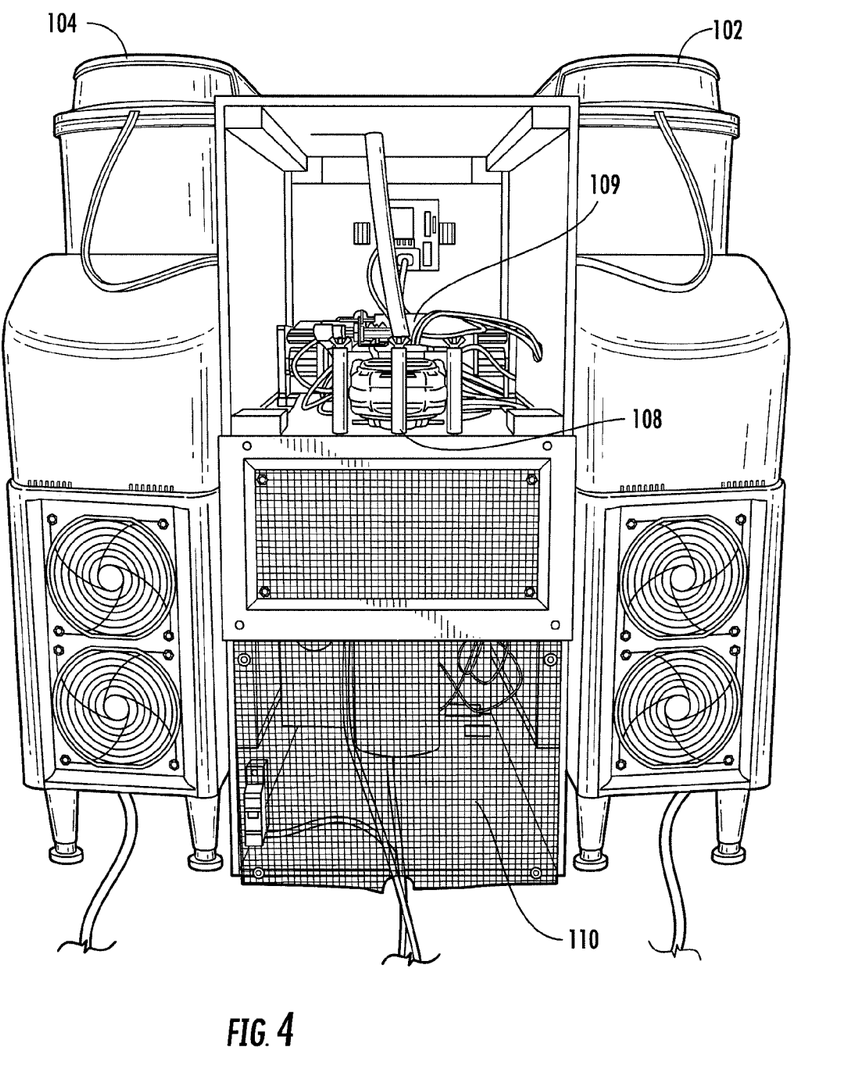
FIG. 4 illustrates a rear view of a frozen beverage dispensing unit in accordance with an aspect of the disclosure.

FIG. 2 illustrates a frozen beverage dispensing unit 100 in accordance with an aspect of the disclosure. In FIG. 2, frozen beverage dispensing unit 100 includes two replaceable frozen beverage modules 102 and 104. As shown in FIG. 2, frozen beverage dispensing unit 100 may be table a top unit or may be included within a full standing cabinet (FIG. 4). In another aspect of the disclosure, dispensing module 106 may be modular in design so that it may be connected to existing or new frozen beverage equipment to increase functionality of such existing or new equipment.

Figure 3:
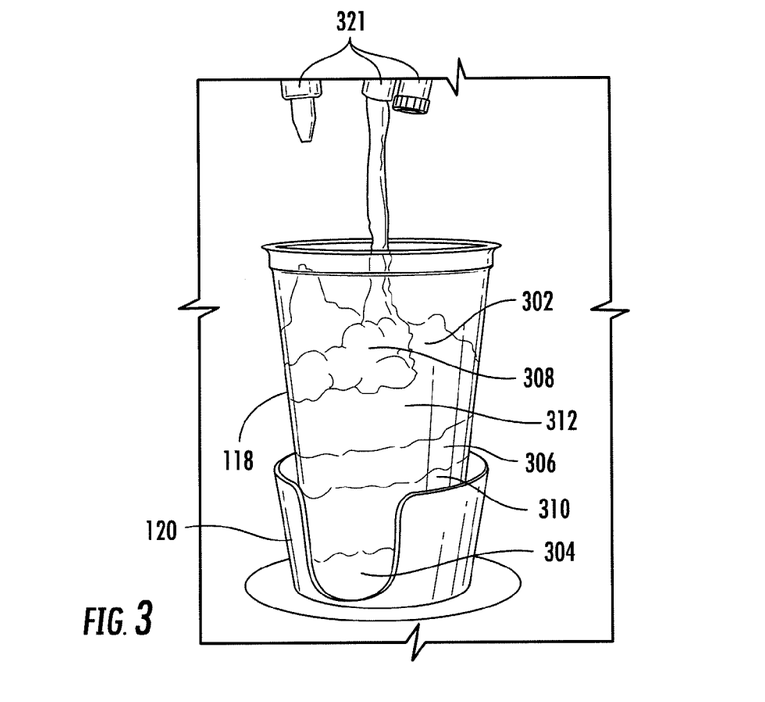
FIG. 3 illustrates a frozen beverage being dispensed by a frozen beverage dispensing unit in accordance with an aspect of the disclosure.

FIG. 3 illustrates a frozen beverage 302 being dispensed by the frozen beverage dispensing unit 100 in accordance with an aspect of the disclosure. In an embodiment, rotating tray 120 may be in motion as frozen beverage 302 is being prepared. As shown in FIG. 3, frozen beverage dispensing unit 100 may create frozen beverages with different patterns such as stripes and swirls in beverage container 118. For instance, frozen beverage 302 may include a first, third, and fifth swirl (304, 306, 308) of a first frozen beverage 103 and a second and fourth swirl (310, 312) of a second frozen beverage 105. Depending upon the number of ingredients that may be added by frozen beverage dispensing unit 102, the total number of different beverage combinations that may be created and dispensed by frozen beverage dispensing unit 100 may be calculated. In an aspect of the disclosure, frozen beverage dispensing unit 100 allows for the creation of unique frozen beverages both in flavor and presentation, the results of which may be consistently replicated.

In an aspect of the disclosure, dispensing module 106 may include dispensing manifold 121. In an embodiment, dispensing manifold 121 may include a plurality of dispensing nozzles 321. In another embodiment, dispensing manifold 121 may include a dispensing gun (not shown) for dispensing a frozen beverage. The beverage gun and/or dispensing nozzles control the flow of the frozen beverage from the replaceable dispensing module 106. One skilled in the art will appreciate that a different dispensing mechanism may also be used.

In an embodiment, dispensing module 106 may be controlled by control unit 122. Control unit 122, may include a processor 124 and memory 126. Memory 126 may include non-volatile and/or volatile memory. Processor 124 may execute computer-executable instructions present in memory 126 such that, for example, a particular beverage is dispensed based upon selection on a display 128. In an embodiment, display 128 may be a touch screen that presents an operator with various user interface screens for selection of various frozen beverages that may be selected.

In an aspect of the disclosure, control unit 122 may be connected to various networks in order to receive updated commands or instructions and/or transmit information to a central location or second control unit. One or more networks may be in the form of a local area network (LAN) that has one or more of the well-known LAN topologies and may use a variety of different protocols, such as Ethernet. One or more of the networks may be in the form of a wide area network (WAN), such as the Internet. Control unit 122 may be connected to one or more of the networks via twisted pair wires, coaxial cable, fiber optics, radio waves or other media.

In an aspect of the disclosure, a number of pre-programmed dispense profiles 130 may be created and stored in memory 126. The created dispense profiles 130 may provide frozen beverage dispensing unit 100 with instructions to produce different frozen beverages. In an embodiment, dispense profiles 130 may also include computer-executable instructions pertaining to how each ingredient of a particular beverage should be dispensed into beverage container 118. In an embodiment, as beverage container 118 is rotated on rotating tray 120, different frozen beverages and/or food add-ins may be dispensed through dispensing module 106 to produce different patterns in beverage container 118. For instance, the patterns may include different stripes or swirls of ingredients. The creation of different patterns creates numerous flavor combinations in beverage container 118. Each of these different patterns may be part of the pre-programmed dispense profiles 130. The use of pre-programmed dispense profile 130 may allow for the creation of consistent frozen beverages.

In an aspect of the disclosure, dispensing profiles 130 may include information such as the speed at which rotating tray 120 will rotate for various selected frozen beverages. In an embodiment, frozen beverage dispensing unit 100 includes a variable speed motor and/or control mechanism to allow rotating tray 120 to turn at different speeds. Furthermore, rotating tray 120 may also reverse directions depending upon instructions included in various dispense profiles 130.

In another aspect of the disclosure, a low noise pump and motor combination 702 (FIG. 7) may be used in accordance with an aspect of the disclosure. The pump and motor combination 702 may be part of plumbing module 108 along with associated values and piping. The pump may be an electrical pump included in frozen beverage dispensing unit 100. In an embodiment, the pump may be used to move frozen beverage ingredients from first replaceable frozen beverage module 102 and second replaceable frozen beverage module 104 into dispensing module 106. In an embodiment, pump motor combination 702 may also be used to mix in food particles from food add-in modules 112-116.

FIG. 4 illustrates a rear view of frozen beverage dispensing unit 100 in accordance with an aspect of the disclosure. As shown in FIG. 4, a first and second replaceable frozen beverage module (102 and 104) may be operationally connected to a dispensing module (FIGS. 1 and 3) through a plumbing module 108. Plumbing module 108 may include a first portion 109 that connects the first replaceable frozen beverage module 102 and the second replaceable frozen beverage module 104 to dispensing module 106. A second portion of the plumbing module 110 may include a pump and motor assembly (702, FIG. 7).

Figure 5:
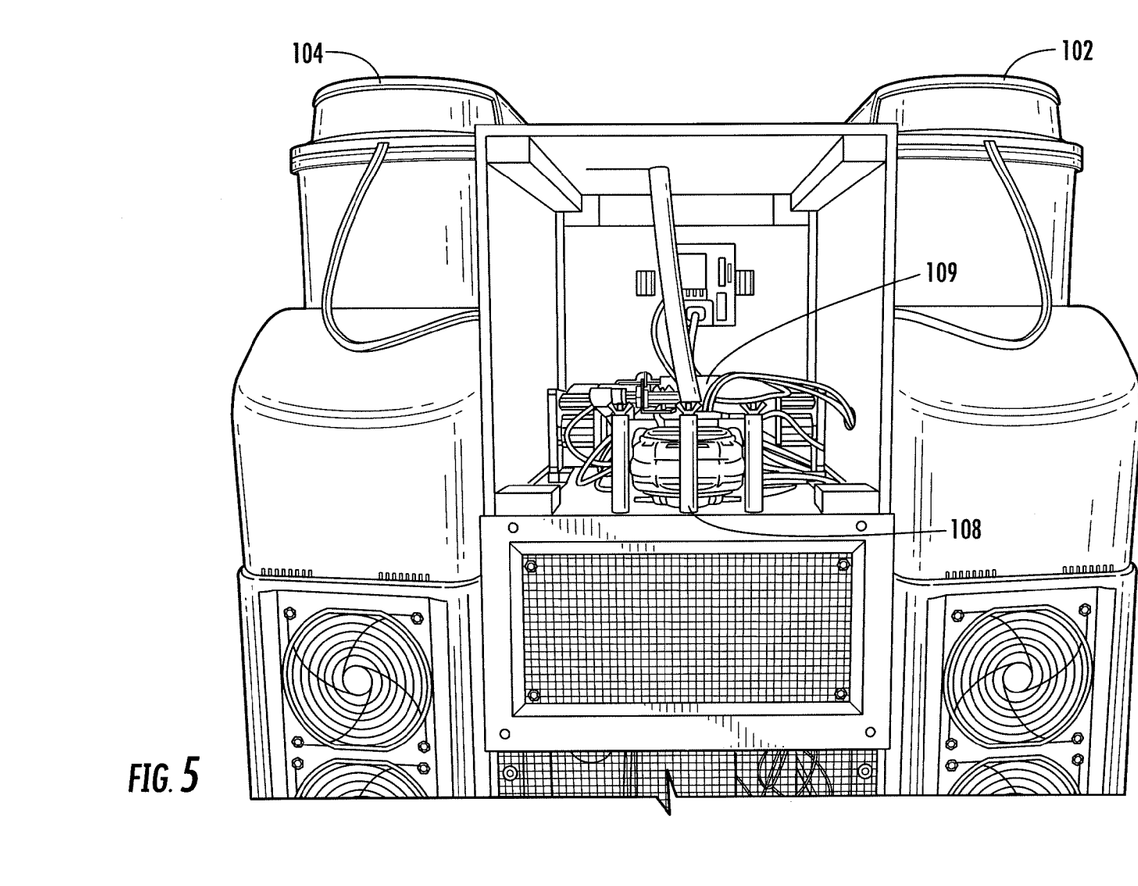
FIG. 5 illustrates a top portion of a frozen beverage dispensing unit from a rear perspective in accordance with an aspect of the disclosure.

FIG. 5 illustrates a top portion of a frozen beverage dispensing unit from a rear perspective in accordance with an aspect of the disclosure.

Figure 6:
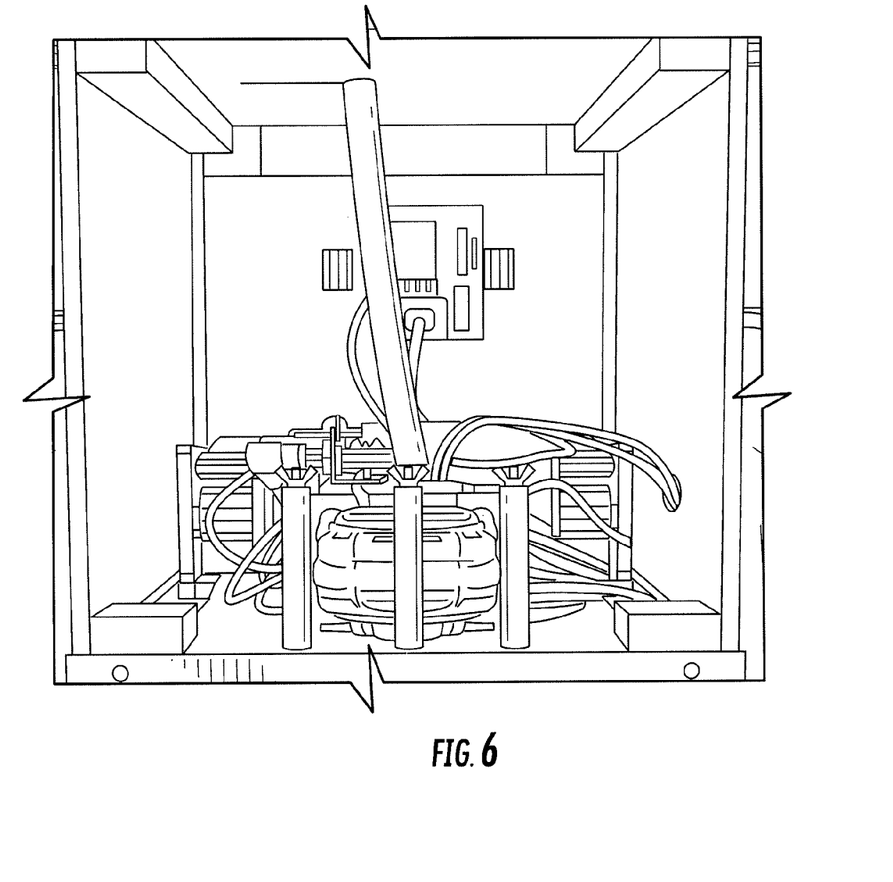
FIG. 6 illustrates an expanded view of FIG. 5 in accordance with an aspect of the disclosure.

FIG. 6 illustrates an expanded view of FIG. 5 in accordance with an aspect of the disclosure.

Figure 7:
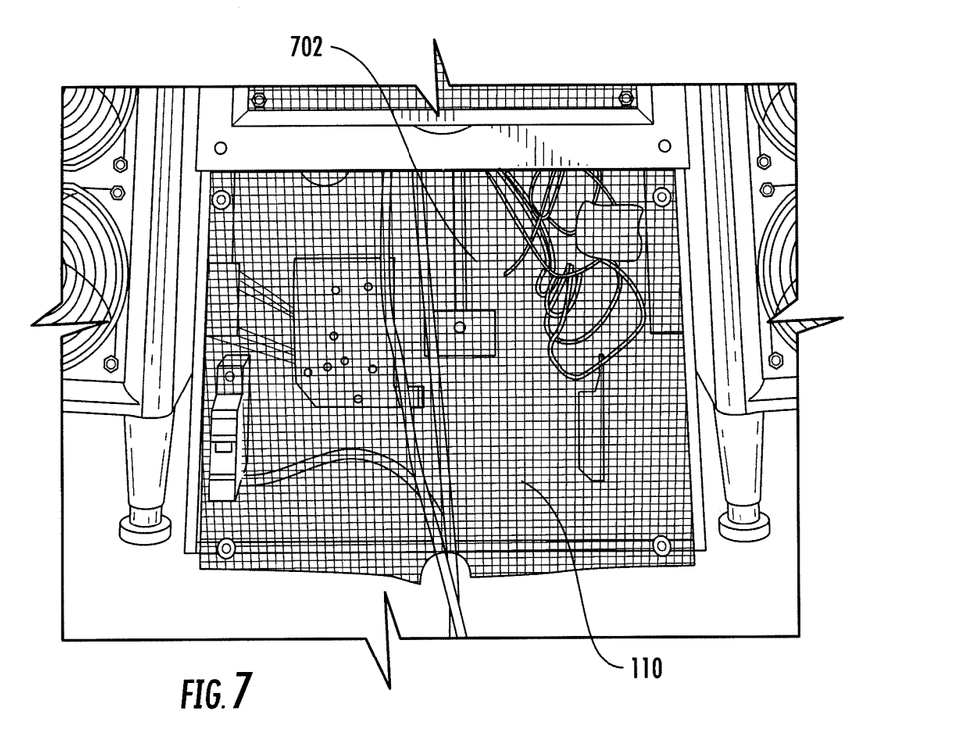
FIG. 7 illustrates a bottom portion of a frozen beverage dispensing unit from a rear perspective in accordance with an aspect of the disclosure.

FIG. 7 illustrates a bottom portion of a frozen beverage dispensing unit 100 from a rear perspective in accordance with an aspect of the disclosure. As shown in FIG. 7, a pump and motor combination 702 may be used move frozen beverage ingredients from first replaceable frozen beverage module 102 and second replaceable frozen beverage module 104 into dispensing module 106. In an embodiment, pump motor combination 702 may also be used to mix in food particles from food add-in modules 112-116.

Figure 8:
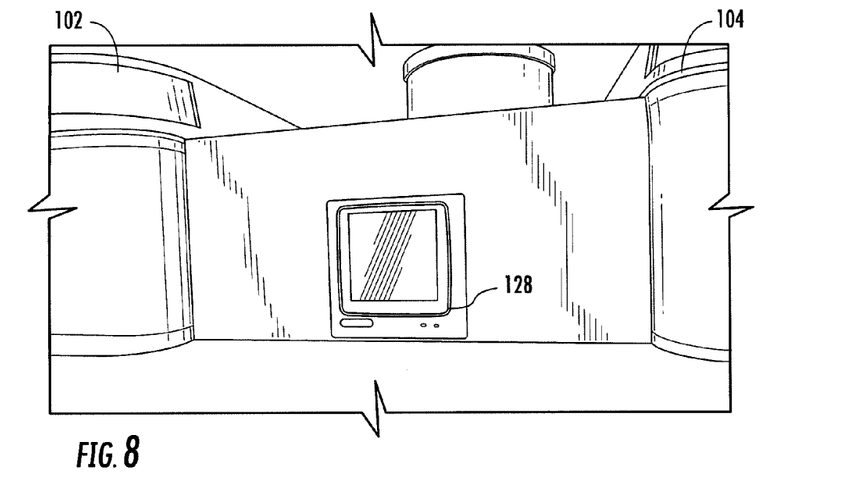
FIG. 8 illustrates a display on a front portion of a frozen beverage dispensing unit in accordance with an aspect of the disclosure.

FIG. 8 illustrates a display located on a front portion of a frozen beverage dispensing unit 100 in accordance with an aspect of the disclosure. In an embodiment, display 128 may be a touch screen that presents an operator with various user interface screens for selection of various frozen beverages that may be selected. Display 128 may present different dispensed profiles 130 to an operator for selection. The dispensing profiles 130 may be altered by the operator, if needed, for creation of specialty drinks that may be different than the selected profile or for which no profile has been created.

Figure 9:
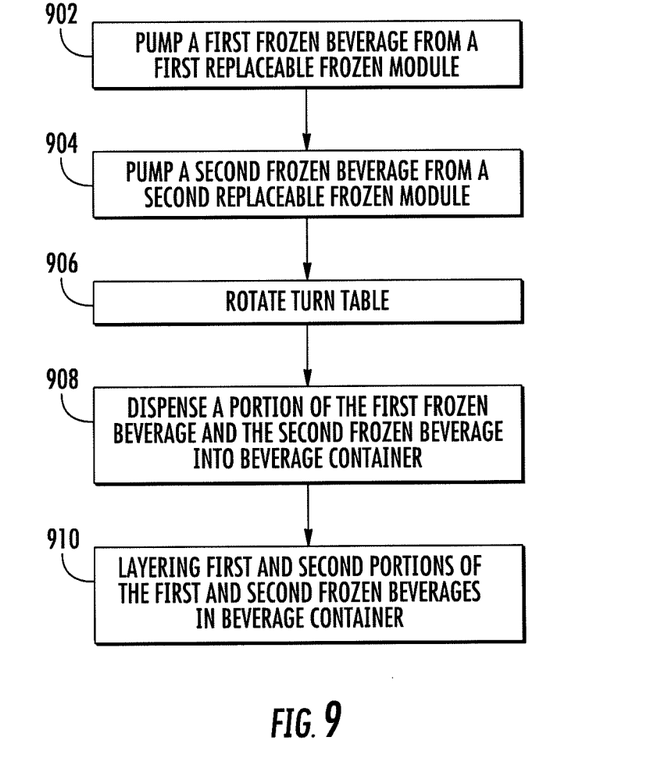
FIG. 9 illustrates a method of providing a layered frozen beverage in accordance with an aspect of the disclosure.

FIG. 9 illustrates a method of providing a layered frozen beverage in accordance with an aspect of the disclosure. In FIG. 9 at step 902, a first frozen beverage may be pumped from a first replaceable frozen beverage module. In step 904, a second frozen beverage may be pumped from a second replaceable frozen beverage module. The pumped first and second frozen beverages may be received at a dispensing module. In step 906, a turn table may begin to rotate based on the selected beverage to be produced. The dispensing module, in step 908, may dispense a portion of the first frozen beverage and a portion of the second frozen beverage into a beverage container while the beverage container is being rotated by a turn table. In step 910, the dispensed first and second portions may be layered on top of each other forming the layered frozen beverage. In an embodiment, the first and second portions of the first and second frozen beverages may be dispensed in different volumes.

The present disclosure has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

We claim:

1. A frozen beverage dispensing unit, comprising:
   a first replaceable frozen beverage module configured to hold a first frozen beverage;
   a second replaceable frozen beverage module configured to hold a second frozen beverage;
   a reversible variable speed turn table, the reversible variable speed turn table configured to hold a beverage container and rotate based on a beverage dispense profile; and
   a dispensing module for dispensing a portion of the first frozen beverage and a portion of the second frozen beverage into the beverage container during rotation of the reversible variable speed turn table, the dispensed portions of the first and second frozen beverages creating layers in the beverage container.

2. The frozen beverage dispensing unit of claim 1, further comprising a plumbing module, the plumbing module configured to connect the first replaceable frozen beverage module and the second replaceable frozen beverage module to the dispensing module.

3. The frozen beverage dispensing unit of claim 2, wherein the first replaceable frozen beverage module, the second replaceable frozen beverage module, the reversible variable speed turn table, the dispensing module, and the plumbing module form a modular frozen beverage dispensing unit.

4. The frozen beverage dispensing unit of claim 1, further comprising an electrical pump.

5. The frozen beverage dispensing unit of claim 1, the dispensing module including a dispensing manifold having a plurality of dispensing nozzles.

6. The frozen beverage dispensing unit of claim 1, further comprising a control unit, the control unit executing beverage dispensing profiles, the beverage dispensing profiles including instructions for creating different frozen beverages.

7. The frozen beverage dispensing unit of claim 6, wherein the beverage dispensing profiles contain instructions for generating layers in a frozen beverage.

8. The frozen beverage dispensing unit of claim 1, further comprising at least one food add-in module.

9. The frozen beverage dispensing unit of claim 8, wherein the at least one food add-in module includes fruit in suspension.

10. The frozen beverage dispensing unit of claim 7, further comprising a touch screen display for executing dispensing profiles.

11. A method of providing a layered frozen beverage, comprising:
    pumping a first frozen beverage from a first replaceable frozen beverage module;
    pumping a second frozen beverage from a second replaceable frozen beverage module;
    rotating a reversible variable speed turn table at a predetermined speed in a clockwise rotation based on a beverage dispense profile; and
    dispensing from a dispensing module a portion of the first frozen beverage;
    rotating the reversible variable speed turn table at the predetermined speed in a counter clockwise rotation based on the beverage dispense profile;
    dispensing a portion of the second frozen beverage into a beverage container during the counter clockwise rotation of the reversible variable speed turn table,
    wherein the dispensed portion of the first frozen beverage and the dispensed portion of the second frozen beverage are layered on top of each other forming the layered frozen beverage.

12. The method of providing a layered frozen beverage of claim 11, wherein the portion of the first frozen beverage and the portion of the second frozen beverage are different in volume.

13. The method of providing a layered frozen beverage of claim 11, further comprising receiving a beverage dispensing profile, the beverage dispensing profile including instructions for creating the layered frozen beverages.

14. The method of providing a layered frozen beverage of claim 13, further comprising receiving a list of beverage dispensing profiles, each beverage dispensing profile including instructions for generating different style layers in a selected frozen beverage.

15. The method of providing a layered frozen beverage of claim 11, further comprising dispensing at least one food add-in from a food add-in module.

16. The method of providing a layered frozen beverage of claim 15, wherein the at least one food add-in module includes a fruit in suspension.

17. A frozen beverage dispensing system, comprising:
an input device for receiving a selection;
a first replaceable frozen beverage module, the first replaceable frozen beverage module configured to hold a first frozen beverage;
a second replaceable frozen beverage module, the second frozen beverage module configured to hold a second frozen beverage;
at least one food add-in module, the at least one food add-in module configured to hold solid food pieces;
a reversible variable speed turn table, the reversible variable speed turn table configured to hold a beverage container and rotate based on a beverage dispense profile; and
a dispensing module for dispensing a portion of the first frozen beverage, a portion of the second frozen beverage, and a portion of the solid food pieces into the beverage container during rotation of the reversible variable speed turn table, the dispensed portions creating at least three layers in the beverage container.

18. The frozen beverage dispensing unit of claim 17, further comprising a control unit, the control unit configured to execute beverage dispensing profiles, the beverage dispensing profiles including instructions for creating different frozen beverages.

19. The frozen beverage dispensing unit of claim 18, wherein the beverage dispensing profiles contain instructions for generating the layers in a selected frozen beverage.

20. The frozen beverage dispensing unit of claim 18, wherein the beverage dispensing profiles further include instructions for controlling the speed of the reversible variable speed turn table as it rotates.

* * * * *

UNITED STATES PATENT AND TRADEMARK OFFICE
CERTIFICATE OF CORRECTION

| | | |
|---|---|---|
| PATENT NO. | : 9,131,709 B2 | Page 1 of 1 |
| APPLICATION NO. | : 13/152819 | |
| DATED | : September 15, 2015 | |
| INVENTOR(S) | : Hammonds et al. | |

It is certified that error appears in the above-identified patent and that said Letters Patent is hereby corrected as shown below:

IN THE CLAIMS

Column 8, line 9, Claim 18: "beverage dispensing unit" should read --beverage dispensing system--.

Column 8, line 14, Claim 19: "beverage dispensing unit" should read --beverage dispensing system--.

Column 8, line 17, Claim 20: "beverage dispensing unit" should read --beverage dispensing system--.

Signed and Sealed this
Twenty-second Day of March, 2016

Michelle K. Lee
*Director of the United States Patent and Trademark Office*